UNITED STATES PATENT OFFICE.

ELIZABETH BARNSTON PARNELL, OF CARSHALTON, ENGLAND.

PROCESS OF TREATING ORES.

SPECIFICATION forming part of Letters Patent No. 693,148, dated February 11, 1902.

Application filed January 3, 1893. Serial No. 665,381. (No specimens.)

*To all whom it may concern:*

Be it known that I, ELIZABETH BARNSTON PARNELL, a subject of the Queen of England, residing at Carshalton, England, have invented certain new and useful Improvements in or Relating to the Treatment of Ores, of which the following is a specification.

This invention relates to the recovery of gold and silver from ores or deposits, its object being to free the precious metals from the base metals, so as to leave the former clean and free in the gangue, from which they may be recovered by any of the well-known solvents or processes.

In carrying out the treatment according to the present invention the ore is first crushed, if necessary, and concentrated by any of the well-known means. The ore is next subjected to the action of a powerful oxidizing agent, for which purpose I have found a convenient method to be to mix chromic acid with the ore. This treatment results in the partial oxidation and decomposition of the ore, which is thereby prepared for roasting. The ore is then roasted, and after roasting the ore, if acid, may be neutralized in any desired manner and the soluble constituents extracted by "boiling" with water under considerable pressure.

The apparatus employed in my process of treatment may be varied as desired, the main features of the process being the thorough separation of the base metals from the precious by boiling under considerable pressure the mixture of the two, in which the base metals have been brought into a soluble state by treatment of the mixture with an oxidizing agent, followed by roasting.

While powerful oxidizers have been employed heretofore in the leaching of ores, the above treatment previous to and preparatory to roasting, which is thereby much facilitated and its duration lessened, is to the best of my knowledge entirely novel and very valuable.

It is known to me that chemicals, such as nitrate of soda or potash, have been added to ore prior to roasting, their oxidizing action being brought about by the roasting operation, that ore mixed with nitrate of lime has been treated in a closed furnace, and that ore reduced to sulfates has been treated when hot with a solution of nitrate or with an alkali, and I do not claim any of these as my invention. These all differ from the process of the present invention in requiring the aid of heat to bring about their oxidizing action.

An essential feature of my invention is the employment of an oxidizing agent which does not require the aid of external heat for its action which is preparatory to and entirely distinct from the operation of roasting. The agent I prefer to use is chromic acid, this use of which is, so far as I am able to ascertain, entirely novel. Chromic acid differs from the materials that have hitherto been mixed with ore before roasting in that while these remain inert until roasting begins chromic acid sets up action immediately upon its admixture with sulfids, and oxidation is continued if the ore is allowed to sweat. I have by repeated trials proved this to be the case and, further, that the period required for roasting is lessened and the complete formation of sulfates secured. This process therefore offers the unique advantages of the rapid and certain formation of sulfates from sulfids with or without roasting and of the certainty of converting all the sulfids present into sulfates. The latter when formed are thoroughly and rapidly extracted by boiling under considerable pressure. I have found that boiling the ore in water under pressure above that of the atmosphere effects the extraction of sulfates more rapidly and cleanly than mere boiling will do. The degree of pressure I employ varies with the nature and quantity of the sulfates to be extracted, as does also the quantity of chromic acid I employ vary with the nature of the ore to which it is to be added. I obtain good results by crushing the ore to pass a forty to sixty mesh screen, concentrating, intimately mixing the crushed ore while still damp with chromic acid, and, when mixture has been thoroughly effected in suitable vessels, covering the vessels and their contents and allowing them to stand for, say, ten to twelve hours. At the end of this period the sulfids will be found more or less completely transformed into sulfates and the complete formation of sulfates by roasting, if necessary, facilitated and insured. The removal of the sulfates may be usually well effected in about twenty minutes by boiling under a pressure of from thirty pounds to sixty pounds per square inch. This last operation may be carried out in any convenient vessel, to which motion is preferably imparted to thoroughly agitate the contents during the operation of boiling. The complete extraction of the sulfates is a matter of the utmost importance, since if they be only partially extracted the gold, as is well known, will be in a worse condition for amalgamation, chlorination, or cyanid process than before the formation of sulfates, and what is known as a "dead-roast," resulting in the formation of insoluble oxids, leaves a better prospect of the recovery of the gold than does an imperfect extraction of sulfates. To obtain, therefore, the full benefit of this process in practice, it is essential that this latter portion receive due attention.

I claim—

1. In the treatment of refractory ores, the process which consists in subjecting them to the action of chromic acid and then roasting them.

2. A process of treating refractory ores which consists in first oxidizing them, then roasting them, and then boiling them in water under pressure.

In testimony whereof I have hereto set my hand in the presence of the two subscribing witnesses.

ELIZABETH BARNSTON PARNELL.

Witnesses:
 HARRY B. BRIDGE,
 A. K. HOAD.